United States Patent
Nishidate

(10) Patent No.: US 7,100,175 B2
(45) Date of Patent: Aug. 29, 2006

(54) DISK APPARATUS WITH PLATE TRIGGER CAM-ENGAGED WITH CAM SLIDER AND PICKUP UNIT AND TOOTH-ENGAGED WITH MOTOR GEAR ASSEMBLY

(75) Inventor: Tetsuo Nishidate, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 355 days.

(21) Appl. No.: 10/768,673

(22) Filed: Feb. 2, 2004

(65) Prior Publication Data
US 2004/0154029 A1    Aug. 5, 2004

(30) Foreign Application Priority Data
Feb. 3, 2003  (JP)  ............... 2003-000501

(51) Int. Cl.
*G11B 17/04* (2006.01)
*G11B 25/04* (2006.01)

(52) U.S. Cl. ............... 720/605; 720/607; 720/613; 720/690

(58) Field of Classification Search ............... 720/605, 720/607, 612, 613, 690
See application file for complete search history.

(56) References Cited

U.S. PATENT DOCUMENTS
2004/0205786 A1 * 10/2004 Kagawa .................. 720/607

FOREIGN PATENT DOCUMENTS
JP    2000-11511    1/2000

* cited by examiner

*Primary Examiner*—Craig A. Renner
(74) *Attorney, Agent, or Firm*—Morgan, Lewis & Bockius LLP

(57) ABSTRACT

A disk apparatus includes a chassis fixed to an apparatus body, a drive unit being ascendable or descendable with respect to the chassis through a plurality of gears by driving a motor, a pickup unit provided with an optical pickup that is movable by driving the motor, a cam slider arranged on the chassis and being movable in a direction, and a plate trigger provided with an inclined cam groove and being movable in the direction through cam engagement with the pickup unit and causes the drive unit to ascend or descend through cam engagement with the cam slider. The plate trigger and the cam slider move integrally in mesh with the gears coupled with the motor respectively. The tip of the tooth of the gear to be in mesh with a triangular tooth formed in the plate trigger is made sharp.

4 Claims, 5 Drawing Sheets

DISK APPARATUS WITH PLATE TRIGGER CAM-ENGAGED WITH CAM SLIDER AND PICKUP UNIT AND TOOTH-ENGAGED WITH MOTOR GEAR ASSEMBLY

BACKGROUND OF THE INVENTION

1. Field of the Invention

This invention relates to a disk apparatus for recording or reproducing a disk such as CD, CD-R, DVD, DVD-R, etc., and more particularly to a driving mechanism for the disk apparatus.

2. Description of the Related Art

A conventional disk apparatus is disclosed in JP-A-2000-11511 (page 3 to page 5, FIG. 1). In this disk apparatus, an apparatus body is provided with a tray for carrying a disk and a drive unit capable of ascending/descending in a direction substantially perpendicularly to the carrying direction of the tray. The drive unit is provided with a pickup unit having an optical pickup for recoding on or reproducing from the disk and a motor for moving the pickup unit in a radial direction of the disk.

A transmission means including a plurality of flat gears is attached to the motor, and transmits a decelerated driving force of the motor. The transmission means meshes with a rack formed on the pickup unit so that the pickup unit can be moved by the motor.

The transmission means is adapted to be capable of gearing with the ascending/descending means. The ascending/descending means is cam-engaged with the drive unit so that it can move in a direction substantially orthogonal to the carrying direction of the tray and ascending/descending direction of the drive unit. Thus, the drive unit ascends or descends. Further, the transmission means is adapted to be capable of meshing with the rack formed on the tray so that the transmission means and tray are coupled with each other at a prescribed timing to transmit the driving force of the motor to the tray.

In the disk apparatus having the configuration described above, when the disk is placed on the tray, the tray is carried into the disk apparatus by driving the motor. When the tray is arranged at a prescribed position, the tray and transmission means are decoupled from each other so that the ascending/descending means and transmission means are coupled with each other. The ascending/descending means moves in a direction perpendicular to the carrying direction of the tray to raise the drive unit. Thus, the drive unit is engaged with the disk so that the disk is chucked.

When the disk is chucked, the transmission means and ascending/descending means are decoupled from each other, and the transmission means is coupled with the pickup unit. Thus, the pickup unit can be moved in a radial direction of the disk so that recording or reproducing can be carried out at a prescribed position of the disk. In dismounting the disk, the operation inverse to that described above will be carried out.

Further, in the case where recording or reproducing is not carried out, the pickup unit is locked so that it cannot move, thereby preventing an accident due to the swing of the pickup unit. According to the disk apparatus disclosed in JP-A-2000-11511 (page 3 to page 5, FIG. 1), the lever member (changing lever 42) which meshes with the pickup unit when the drive unit descends is urged by an elastic body (elastic locking body 44) so that the pickup unit is locked.

However, the above conventional disk apparatus presented a problem of increasing the number of components because the lever member and elastic body are required for locking the pickup unit.

SUMMARY OF THE INVENTION

An object of this invention is to provide a disk apparatus capable of reducing the number of components.

In order to attain the above object, this invention provides a disk apparatus including: an apparatus body; a chassis fixed to the apparatus body; a drive unit having a motor and a plurality of gears, the drive unit being ascendable and descendable in a ascending/descending direction with respect to the chassis through the plurality of gears by driving the motor; a pickup unit having an optical pickup and attached to the drive unit, the pickup unit being movable in a direction substantially orthogonal to the ascending/descending direction of the drive unit by driving the motor; a cam slider disposed on the chassis and being movable in a direction substantially orthogonal to the ascending/descending direction of the drive unit and a moving direction of the pickup unit; and a plate trigger having an inclined cam groove and a triangular tooth, the plate trigger disposed on the drive unit and being movable in the same direction as the cam slider through cam engagement with the pickup unit and causes the drive unit to ascend or descend through cam engagement with the cam slider; wherein the plate trigger and the cam slider respectively mesh with the gears coupled with the motor to thereby move together; and a tooth of the gear to be in mesh with the triangular tooth of the plate trigger has a sharp tip.

In accordance with this configuration, when dismounting the disk from the disk apparatus, the pickup unit moves toward the inner periphery of the disk. The pickup unit is cam-engaged with the cam groove to move the plate trigger, and the plate trigger and the cam slider move integrally in cam engagement. Thus, the plate trigger and the cam slider can mesh with the gears coupled with the motor, respectively. At this time, the gear with a sharp tooth tip meshes with the triangular tooth formed on the plate trigger so that the mutual pushing at the start of meshing is prevented. When the plate trigger and cam slider move integrally by gear driving, the pickup unit is locked through the cam engagement with the plate trigger so that the movement of the plate trigger is stopped. When the cam slider further moves, the drive unit descends through the cam engagement between the plate trigger and cam slider.

This invention also provide a disk apparatus including: an apparatus body; a chassis fixed to the apparatus body; a drive unit having a motor and a plurality of gears, the drive unit being ascendable and descendable in a ascending/descending direction with respect to the chassis through the plurality of gears by driving the motor; a pickup unit having an optical pickup and attached to the drive unit, the pickup unit being movable in a direction substantially orthogonal to the ascending/descending direction of the drive unit by driving the motor; a cam slider disposed on the chassis and being movable in a direction substantially orthogonal to the ascending/descending direction of the drive unit and a moving direction of the pickup unit; and a plate trigger having an inclined cam groove and a rack to be in mesh with the gear coupled with the motor, the plate trigger disposed on the drive unit and being movable in the same direction as the cam slider through cam engagement with the pickup unit and causes the drive unit to ascend or descend through cam engagement with the cam slider.

According to the invention, the rack may be formed of a triangular tooth.

According to the invention, a tooth of the gear to be in mesh with the triangular tooth may have a sharp tip.

DETAILED DESCRIPTION OF THE PREFFERED EMBODIMENTS

Figure 1:
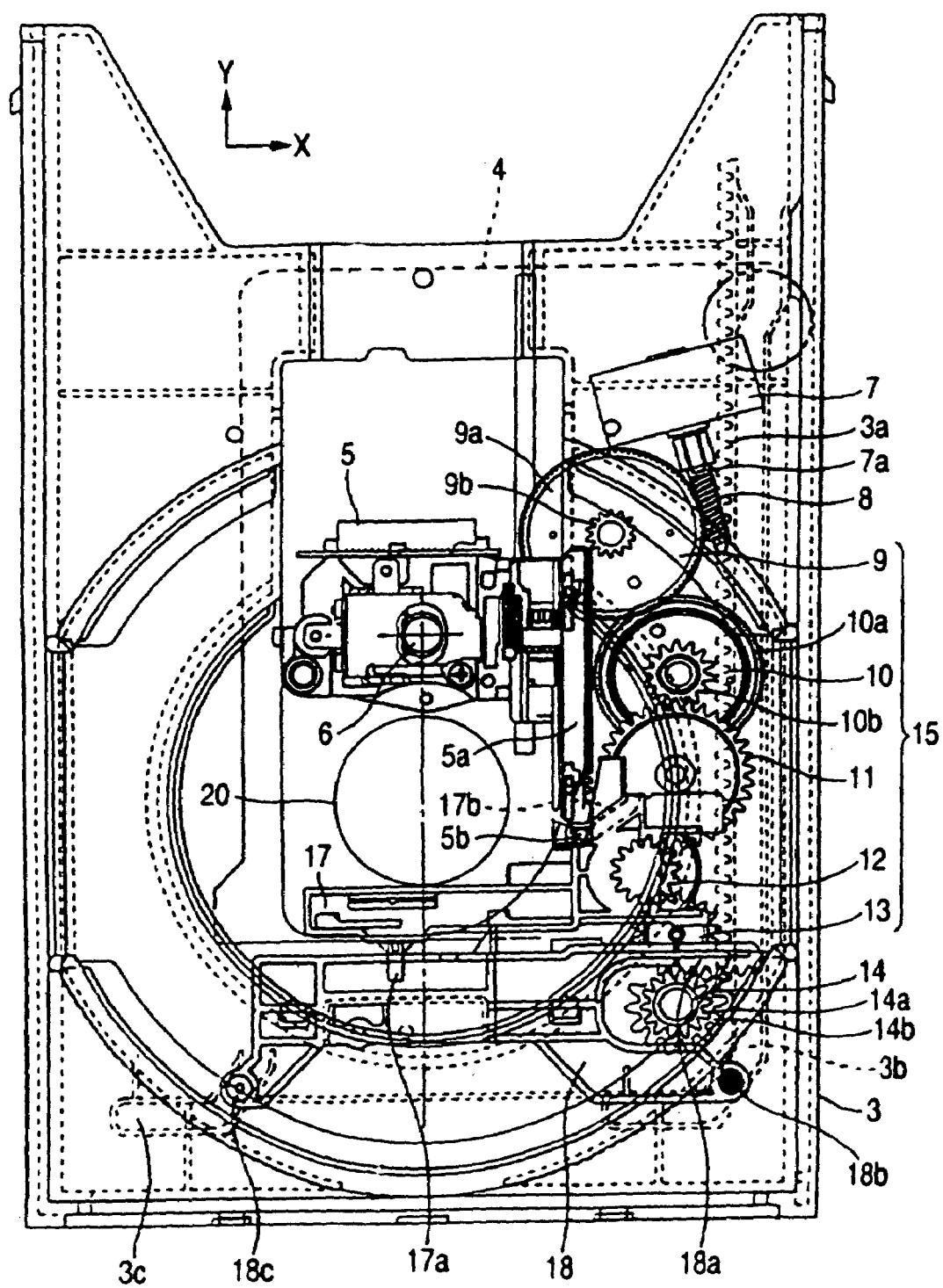
FIG. 1 is a top view showing a disk apparatus according to an embodiment of this invention.

Now referring to the drawings, an explanation will be given of an embodiment of this invention. FIG. 1 is a plan view of the disk apparatus according to an embodiment of this invention. A chassis (not shown) is fixed to the disk apparatus 1. To the chassis are attached a tray 3 for carrying a disk moving in a Y direction with respect to the chassis and a drive unit 4 which is movable in a Z direction (direction perpendicular to the surface of the sheet of FIG. 1).

The drive unit 4 is provided with a chuck portion 20 capable of chucking the disk placed on the tray by the movement in the Z direction in engagement with a hole of the disk. The drive unit 4 is also provided with a pickup unit 5 having an optical pickup unit 6 located on a center line of the chuck portion 20. The pickup unit 5 is adapted to move in the Y direction so that the recording or reproducing of the disk is carried out by the optical pickup 6.

On one side of the pickup unit 5, a motor 7 and transmission portion 15 consisting of a plurality of gears for transmitting the driving force of the motor are arranged. A worm gear 8 is attached to a motor shaft 7a of the motor 7. A worm wheel 9a, which is a lower gear of a double or two-step deceleration gear 9, meshes with the worm gear 8. A flat gear 9b, which is an upper gear of the deceleration gear 9, is able to mesh with a rack 5a formed on the pickup unit 5. In this way, the pickup unit 5 is driven by the motor 7.

The worm wheel 9a meshes with a worm wheel 10a which is a lower gear of a double or two-step deceleration gear 10, and is coupled with a flat gear 12 through a flat gear 10b which is an upper gear of the deceleration gear 10 and a flat gear 11. As described later, the flat gear 12 is able to mesh with a triangular tooth 17c (FIG. 8) of a plate trigger 17.

The flat gear 12 meshes with a flat gear 14a, which is a lower gear of a double or two-step tray gear 14, through a flat gear 13. The tray gear 14 is attached to the chassis. A flat gear 14b, which is an upper gear of the tray gear 14, is able to mesh with a rack 3a formed on the tray 3. In this way, the tray 3 is driven by the motor 7.

Figure 8:
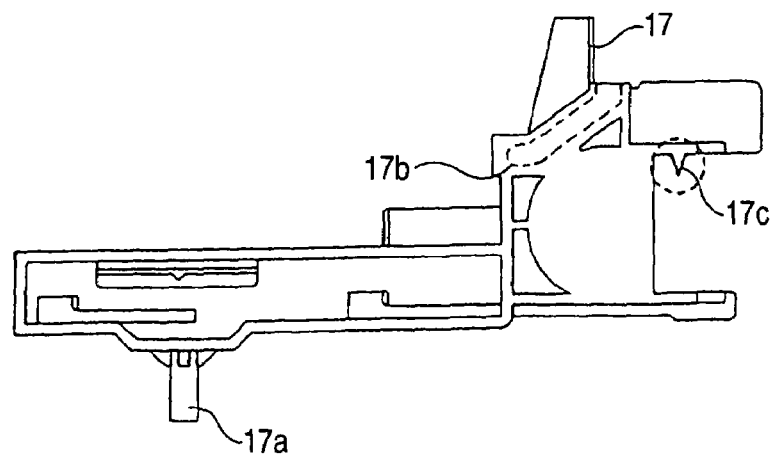
FIG. 8 is a plan view of a plate trigger of the disk apparatus.
Figure 9:
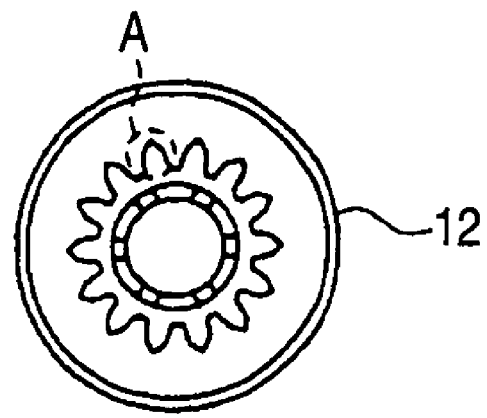
FIG. 9 is a plan view of a flat gear that meshes with the plate trigger.
Figure 10:
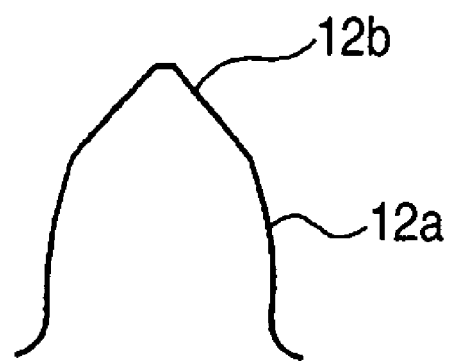
FIG. 10 is an enlarged view of the flat gear.

At the end of the drive unit 4, a plate trigger 17 is arranged to be movable in an X direction. FIG. 8 is a plan view of the plate trigger 17. The plate trigger 17 has a cam protrusion 17a. A triangular tooth 17c formed at one end of the plate trigger 17 is able to mesh with the flat gear 12. FIG. 9 is a plan view of the flat gear 12. FIG. 10 shows a part A in FIG. 9. As seen from these figures, the teeth of the flat gear 12 each has a tooth base 12a formed in an involute curve in a plan view. The involute curve is cut out to form a sharp tooth tip 12b.

The plate trigger 17 has a cam groove 17b which is to be engaged with a boss 5b formed on the pickup unit 5. When the pickup unit 6 moves downward in FIG. 1, the plate trigger 17 moves rightwards in FIG. 1 by the engagement of the boss 5b and the cam groove 17b. When the plate trigger 17 moves leftwards in FIG. 1, the pickup unit 6 moves upward in FIG. 1.

Figure 7:
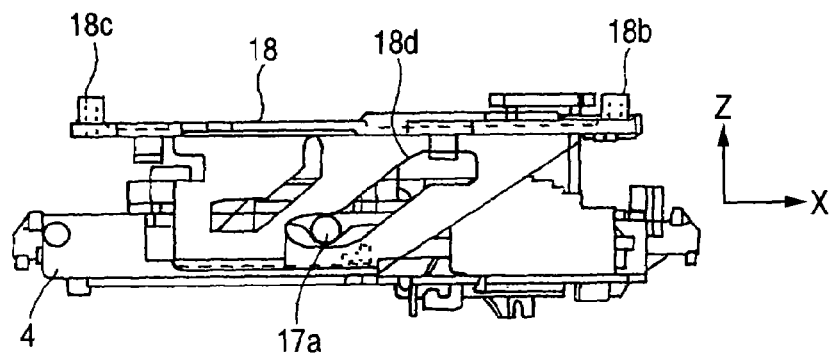
FIG. 7 is a front view of the state where the drive unit of the disk apparatus has descended.

On the chassis, a cam slider 18 is arranged oppositely to the plate trigger 17. The cam slider 18 is movable in the X direction by the motor 7 in such a manner that a rack 18a meshes with the lower flat gear 14a of the tray gear 14. The cam slider 18 has a cam groove 18d which is engaged with the cam protrusion 17a (FIG. 7).

When the cam slider 18 moves in the X direction, the drive unit 4 as well as the plate trigger 17 can ascend or descend in the Z direction. The cam slider 18 has protruded bosses 18b and 18c which are engaged with the cam grooves 3b and 3c of the tray 3 so that the tray can be moved in the Y direction.

Figure 2:
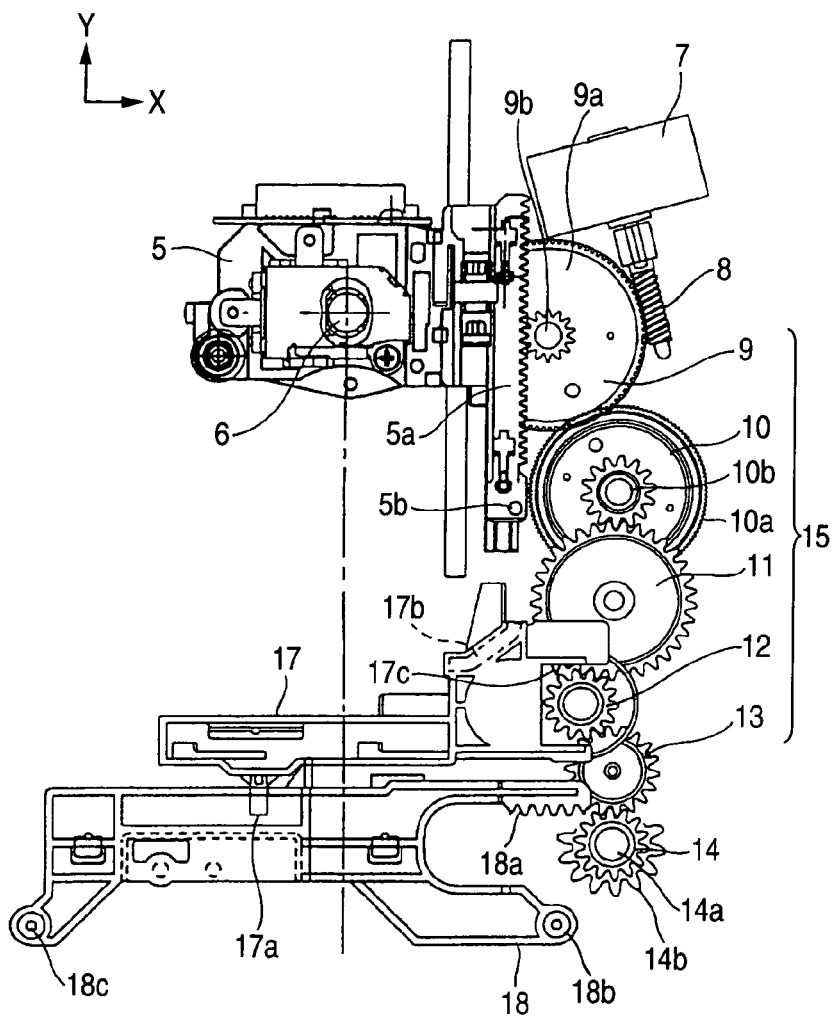
FIG. 2 is a top view for explaining the operation of the disk apparatus.
Figure 3:
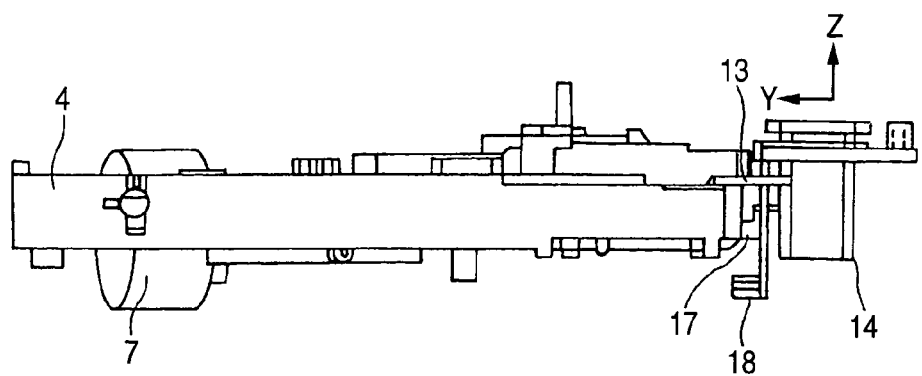
FIG. 3 is a side view of the state where a drive unit of the disk apparatus has ascended.
Figure 4:
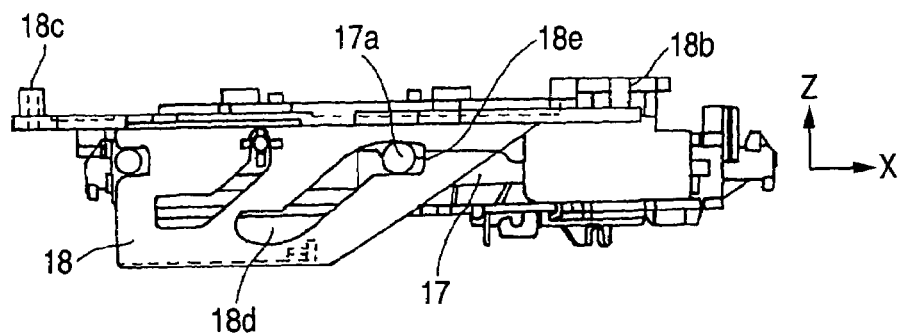
FIG. 4 is a front view of the state where the drive unit of the disk apparatus has ascended.

In the disk apparatus 1 having the above configuration, an explanation will be given of the operating of mounting or dismounting the disk. FIG. 2 is a plan view of the main portion of the disk apparatus 1 in a state where the tray 3 with the disk placed thereon has been carried into the disk apparatus 1. FIGS. 3 and 4 are a side view and a front view of the disk apparatus 1 in this state.

The rotation of the worm gear 8 attached to the motor shaft 7a rotatively drives each of the gears of the transmission portion 15 arranged in the drive unit 4 (FIG. 1) and the tray gear 14 provided in the chassis (not shown). In the state where the disk is arranged in the disk apparatus 1, the flat gear 9b integral to the worm wheel 9a which meshes with the worm gear 8 meshes with the rack 5a of the pickup unit 5. Thus, the normal/reverse rotation of the motor 7 moves the pickup unit 5 in the radial direction of the disk (Y direction) reciprocatively so that the optical pickup 6 is arranged at a prescribed position.

At this time, the engagement between the boss 5b of the pickup unit 5 and the cam groove 17b of the plate trigger 17 is released, and the mesh between the triangular tooth 17c of the plate trigger 17 and the flat gear 12 is released. Further, the mesh between the rack 18a of the cam slider 18 and the tray gear 14 is released, and the mesh between the tray gear 14 and the rack 3a of the tray 3 is released.

In FIG. 2, the cam slider 18 is arranged relatively leftward. Because of the engagement between the cam protrusion 17a of the plate trigger 17 and cam groove 18d of the cam slider 18, the side on the tray gear 14 of the drive unit is raised from the chassis as seen from FIGS. 3 and 4. Thus, the disk is engaged with and chucked by the chuck portion 20 (FIG. 1).

Figure 5:
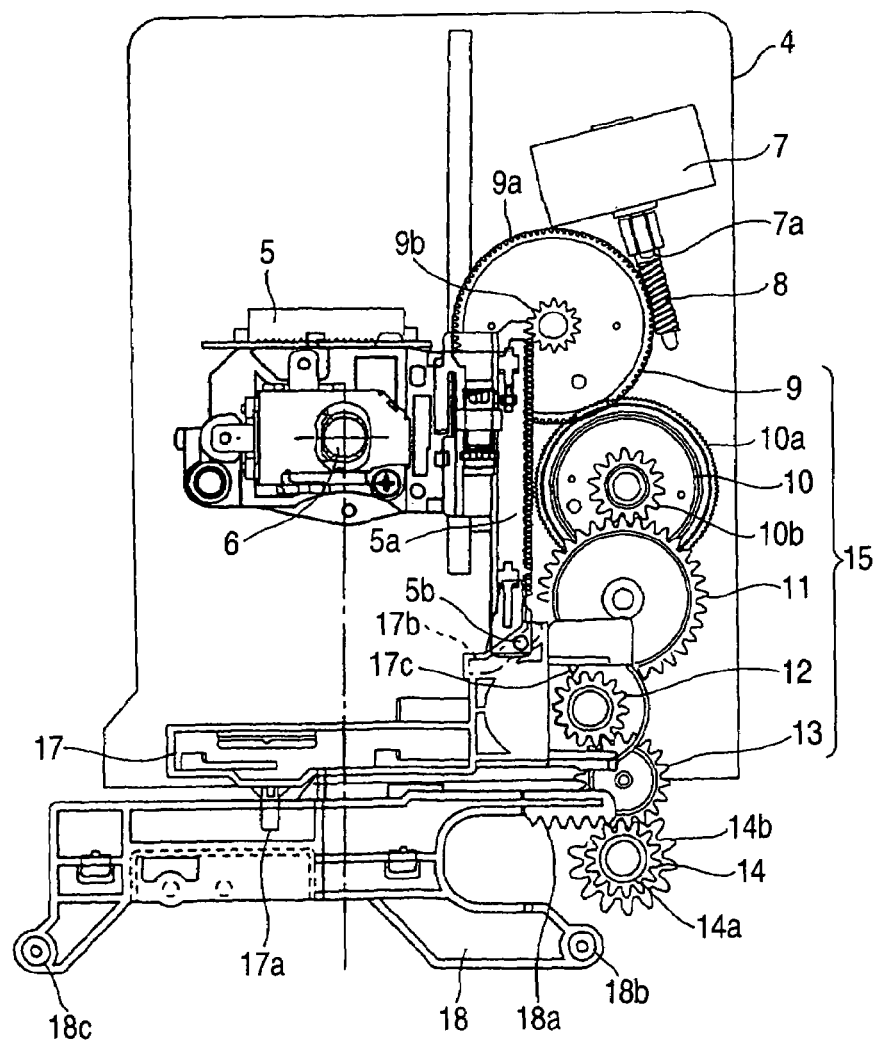
FIG. 5 is a top view for explaining the operation of the disk apparatus.

In taking out the disk, when the worm wheel 9a rotates counterclockwise in FIG. 2, the pickup unit 5 moves toward the plate trigger 17. As seen from FIG. 5, when the boss 5a of the pickup 5 is engaged with the cam groove 17b of the plate trigger 17, the plate trigger 17 is moved rightward in FIG. 5 by the guiding by the cam groove 17b.

Thus, the mesh between the triangular tooth 17 of the plate trigger 17 and the flat gear 12 is started and the mesh between the flat gear 9b of the deceleration gear 9 and the rack 5a is released. Because of the movement of the plate trigger 17, the cam protrusion 17a is brought into contact with the one end 18e of the cam groove 18d.

The cam slider 18 moves integrally to the plate trigger 17 so that the rack 18a meshes with the flat gear 14a of the tray gear 14. Thus, the plate trigger 17 and the cam slider 18 are moved by driving the flat gear 12 and tray gear 14, respectively. In this case, the number of the teeth of each gear is prescribed so that the plate trigger 17 and the cam slider 18 move at the same speed.

When the boss 5a of the pickup unit 5 is arranged at the end of the cam groove 17b of the plate trigger 17, as shown in FIG. 1, the movement of the pickup unit 5 in the Y direction is locked. When the motor 7 further rotates, the mesh between the flat gear 12 and the triangular tooth 17c is released so that the cam slider 18 is moved solely in the X direction by the cam slider 18.

Figure 6:
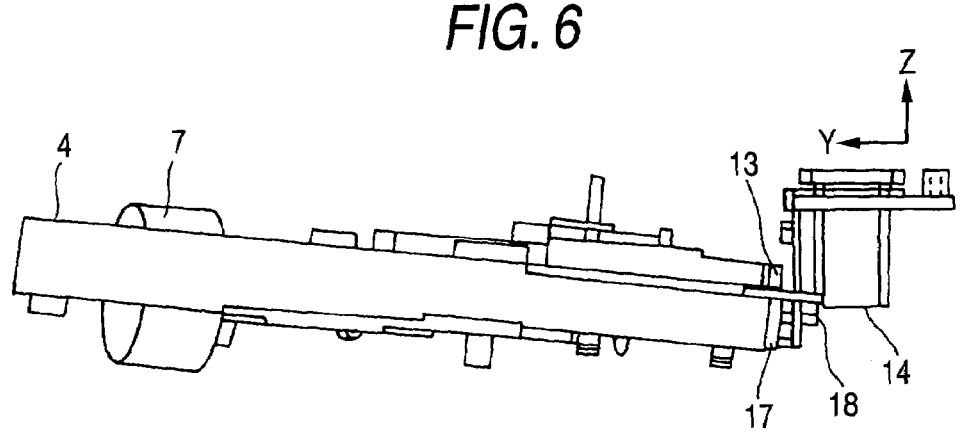
FIG. 6 is a side view of the state where the drive unit of the disk apparatus has descended.

Thus, the cam protrusion 17a of the plate trigger 17 is guided by the cam groove 18d of the cam slider 18. As seen from the side view and front view of FIGS. 6 and 7, the drive unit 4 rotates to lower its one end so that the chucking of the disk is released. Therefore, by moving the plate trigger 17 and the cam slider 18 integrally using the flat gear 12 and tray gear 14, the drive unit 4 can be lowered after the pickup unit 5 has been locked. Thus, the accident due to swinging of the pickup unit 5 can be prevented.

When the cam slider 18 is moved, the bosses 18b and 18c of the cam slider 18 are guided by the cam grooves 3b and 3c so that the tray 3 is pushed out downward in FIG. 1. Thus, the mesh between the rack 3a of the tray 3 and the flat gear 14b of the tray gear 14 is started and the mesh between the flat gear 14a of the tray gear 14 and the cam slider 18 is released. The tray is taken out by rotation of the tray gear 14.

When the tray 3 is pressed manually for its carry-in, the motor shaft 7a rotates through the rack 3a of the tray 3, tray gear 14, transmission portion 15 and worm gear 8. Then, the start of the carry-in operation of the tray 3 is detected to drive the motor 7. Thus, the tray 3 is carried in by the operation opposite to the operation described above.

In accordance with this embodiment, the plate trigger 17 is provided with the triangular tooth 17c so that it can be moved by the flat gear 12. The pickup unit 5 can be therefore locked. Thus, the accident due to swinging of the pickup unit 5 can be prevented and the number of components required for its locking can be reduced.

Further, even if great load occurs when the boss 5b is engaged with the inclined cam groove 17c, the plate trigger 17 can be moved by the flat gear 12. Therefore, the cam groove 17b is formed at a small angle with respect to the X direction so that the stroke of the pickup unit 5 can be shortened, thereby permitting the disk apparatus to be downsized.

Since the triangular tooth 17 and the tooth tip of the flat gear 12 are sharp, the collision between the tooth of the flat gear 12 and the triangular tooth 17c of the plate trigger 17 which moves in the X direction through the cam engagement with the pickup unit 5 can be prevented. This prevents the breakage of the teeth and excessive load for the motor due to the mutual pushing between the triangular tooth 17c and the tooth of the flat gear 12.

The plate trigger 17 and the cam slider 18 can be moved integrally in mesh with the flat gear 12 and the tray gear 14 coupled with the motor 7, respectively. For this reason, after the pickup unit 5 which is engaged with the plate trigger 17 has been locked, the drive unit 5 can be caused to ascend or descend.

In accordance with this invention, the plate trigger is provided with the triangular tooth so that it can be moved by the gear, thereby permitting the pickup unit to be locked. Thus, the accident due to the swinging of the pickup unit can be prevented, and the number of components required for locking can be also reduced.

Further, even if great load occurs when the boss 5b is engaged with the inclined cam groove, the plate trigger can be moved by the gear. Therefore, the cam groove is formed at a large pressure angle so that the stroke of the pickup unit can be shortened, thereby permitting the disk apparatus to be downsized.

Since the triangular tooth and the tooth tip of the gear to be in mesh therewith are sharp, the collision between the tooth of the gear and the triangular tooth of the plate trigger which moves through the cam engagement with the pickup unit can be prevented. This prevents the breakage of the teeth and excessive load for the motor due to the mutual pushing between the triangular tooth and the tooth of the gear.

The plate trigger and the cam slider can be moved integrally in mesh with the gears coupled with the motor, respectively. For this reason, after the pickup unit which is engaged with the plate trigger has been locked, the drive unit can be caused to ascend or descend.

What is claimed is:

1. A disk apparatus comprising:
an apparatus body;
a chassis fixed to the apparatus body;
a drive unit having a motor and a plurality of gears, the drive unit being ascendable and descendable in a ascending/descending direction with respect to the chassis through the plurality of gears by driving the motor;
a pickup unit having an optical pickup and attached to the drive unit, the pickup unit being movable in a direction substantially orthogonal to the ascending/descending direction of the drive unit by driving the motor;
a cam slider disposed on the chassis and being movable in a direction substantially orthogonal to the ascending/descending direction of the drive unit and a moving direction of the pickup unit; and
a plate trigger having an inclined cam groove and a rack to be in mesh with one of the gears coupled with the motor, the plate trigger disposed on the drive unit and being movable in the same direction as the cam slider through cam engagement with the pickup unit and causes the drive unit to ascend or descend through cam engagement with the cam slider.

2. The disk apparatus according to claim 1, wherein the rack comprises a triangular tooth.

3. The disk apparatus according to claim 2, wherein a tooth of the gear to be in mesh with the triangular tooth has a sharp tip.

4. A disk apparatus comprising:
an apparatus body;
a chassis fixed to the apparatus body;
a drive unit having a motor and a plurality of gears, the drive unit being ascendable and descendable in a ascending/descending direction with respect to the chassis through the plurality of gears by driving the motor;

a pickup unit having an optical pickup and attached to the drive unit, the pickup unit being movable in a direction substantially orthogonal to the ascending/descending direction of the drive unit by driving the motor;

a cam slider disposed on the chassis and being movable in a direction substantially orthogonal to the ascending/descending direction of the drive unit and a moving direction of the pickup unit; and a plate trigger having an inclined cam groove and a triangular tooth, the plate trigger disposed on the drive unit and being movable in the same direction as the cam slider through cam engagement with the pickup unit and causes the drive unit to ascend or descend through cam engagement with the cam slider;

wherein the plate trigger and the cam slider respectively mesh with the gears coupled with the motor to there by move together; and a tooth of the gear to be in mesh with the triangular tooth of the plate trigger has a sharp tip.

* * * * *